(12) United States Patent
Huh (10) Patent No.: US 8,543,686 B2
(45) Date of Patent: Sep. 24, 2013

(54) DYNAMIC RESOURCE COLLABORATION BETWEEN NETWORK SERVICE PROVIDERS

(75) Inventor: Eui-Nam Huh, Seoul (KR)

(73) Assignee: University-Industry Cooperation Group of Kyung Hee University, Yongin-Si, Gyeonggi-Do (KR)

( * ) Notice: Subject to any disclaimer, the term of this patent is extended or adjusted under 35 U.S.C. 154(b) by 69 days.

(21) Appl. No.: 12/507,938

(22) Filed: Jul. 23, 2009

(65) Prior Publication Data

US 2011/0022697 A1    Jan. 27, 2011

(51) Int. Cl.
    *G06F 15/173* (2006.01)
(52) U.S. Cl.
    USPC ............................ 709/224; 709/104; 709/223
(58) Field of Classification Search
    USPC .................. 709/201, 202, 203, 218, 219, 223, 709/224, 225, 226, 229, 238
    See application file for complete search history.

(56) References Cited

U.S. PATENT DOCUMENTS

| | | | |
|---|---|---|---|
| 5,774,660 A | 6/1998 | Brendel et al. | |
| 7,043,225 B1* | 5/2006 | Patel et al. | 455/405 |
| 2001/0029519 A1* | 10/2001 | Hallinan et al. | 709/104 |
| 2001/0052016 A1 | 12/2001 | Skene et al. | |
| 2002/0116234 A1 | 8/2002 | Nagasawa | |
| 2003/0126202 A1 | 7/2003 | Watt | |
| 2004/0260652 A1* | 12/2004 | Rose | 705/51 |
| 2005/0063300 A1 | 3/2005 | Dominic | |
| 2005/0278441 A1* | 12/2005 | Bond et al. | 709/223 |
| 2006/0064478 A1 | 3/2006 | Sirkin | |
| 2006/0242641 A1* | 10/2006 | Kinsey et al. | 718/1 |

FOREIGN PATENT DOCUMENTS

| | | |
|---|---|---|
| JP | 2002245282 A | 8/2002 |
| JP | 2005250818 A | 9/2005 |
| WO | 98/57275 | 12/1998 |
| WO | 02/095605 | 11/2002 |

OTHER PUBLICATIONS

Timothy J. Norman, et al "Agent-based formation of virtual organisations" Science Direct, Knowledge-Based Systems 17 (2004) 103-111.
Jos Trienekens, et al "Specification of Service Level Agreements, clarifying concepts on the basis of practical research" Improve Quality Services, The Netherlands [to be published].
A. Westerinen, et al "Terminology for Policy-Based Management" Memo, The Internet Society, Nov. 2001.
Australian Patent Office, International Search Report & Written Opinion in related PCT Application No. PCT/KR2010/004843, Mailed Oct. 27, 2010.
Irwin et al., "Balancing Risk and Reward in a Market-based Task Service", High performance Distributed Computing, 2004. Proceedings. 13th IEEE International Symposium, pp. 160-169.

\* cited by examiner

*Primary Examiner* — Barbara Burgess
(74) *Attorney, Agent, or Firm* — Workman Nydegger (57) ABSTRACT

Service providers capable of dynamic resource collaboration and corresponding dynamic resource collaboration techniques are provided. In one embodiment, a network service provider includes a service server that processes service requests, a resource monitoring unit that monitors available computing resources of the service server and generates a resource request for supplementary computing resources from one or more collaborating network service providers based on the result of the monitoring, and a resource collaboration unit acquires supplementary computing resources from at least one of the collaborating network service providers.

19 Claims, 3 Drawing Sheets

DYNAMIC RESOURCE COLLABORATION BETWEEN NETWORK SERVICE PROVIDERS

BACKGROUND

The continued development of the Internet has made possible the offering of various network services to service consumers. Typically, existing network services are operated by individual network service providers such as public companies or private companies. Each network service provider creates its own closed network, which is expensive to setup and maintain. Furthermore, network service providers often make specific commitments to their customers (i.e., consumers) by entering into Service Level Agreements (SLAs). An SLA is a contract between a network service provider and a consumer that specifies the network service provider's commitments and penalties if those commitments are not met. If the network service provider is unable to provide quality service to the level specified in the SLA, it may result in an SLA violation and adversely affect the network service provider.

SUMMARY

According to an illustrative embodiment, a network service provider includes a service server that processes service requests, a resource monitoring unit that monitors available computing resources of the service server and generates a resource request for supplementary computing resources from one or more collaborating network service providers based on the result of the monitoring, and a resource collaboration unit that, in response to the resource request, acquires supplementary computing resources from at least one of the collaborating network service providers.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

In one illustrative embodiment, a network service provider endeavors to balance its service requirements against high costs of deploying customer- or service consumer-dedicated, over-provisioned resources. The terms "customer" and "service consumer" will be interchangeably used herein. Thus, to control expenses and avoid the potential peak load threat of violating service level agreements (SLAs) with customers, the network service provider may leverage computing resources from collaborating network service providers through dynamic resource collaboration. Through negotiation between the network service provider and the collaborating network service providers for the dynamic resource collaboration, the collaborating network service providers may agree to allocate some of their local computing resources such as web servers, application services, network bandwidth, etc. for use by the network service provider. That is, the collaborating network service providers may agree to allocate some of their local computing resources to service the network service provider's service consumers.

A collaboration arrangement created as a result of the negotiation between the network service provider and each of the collaborating network service providers that provisions and shares the local computing resources may specify terms regarding settlement and exchange of generated revenue. The network service provider that acquires the local computing resources from the collaborating network service providers controls the acquired local computing resources. That is, the network service provider has delegated rights to the collaborating network service providers' physical resources. The physical resources may include computing resources such as processing power, memory, data storages, application resources, or networking infrastructures from the collaborating network service providers distributed over different geographical locations.

Figure 1:
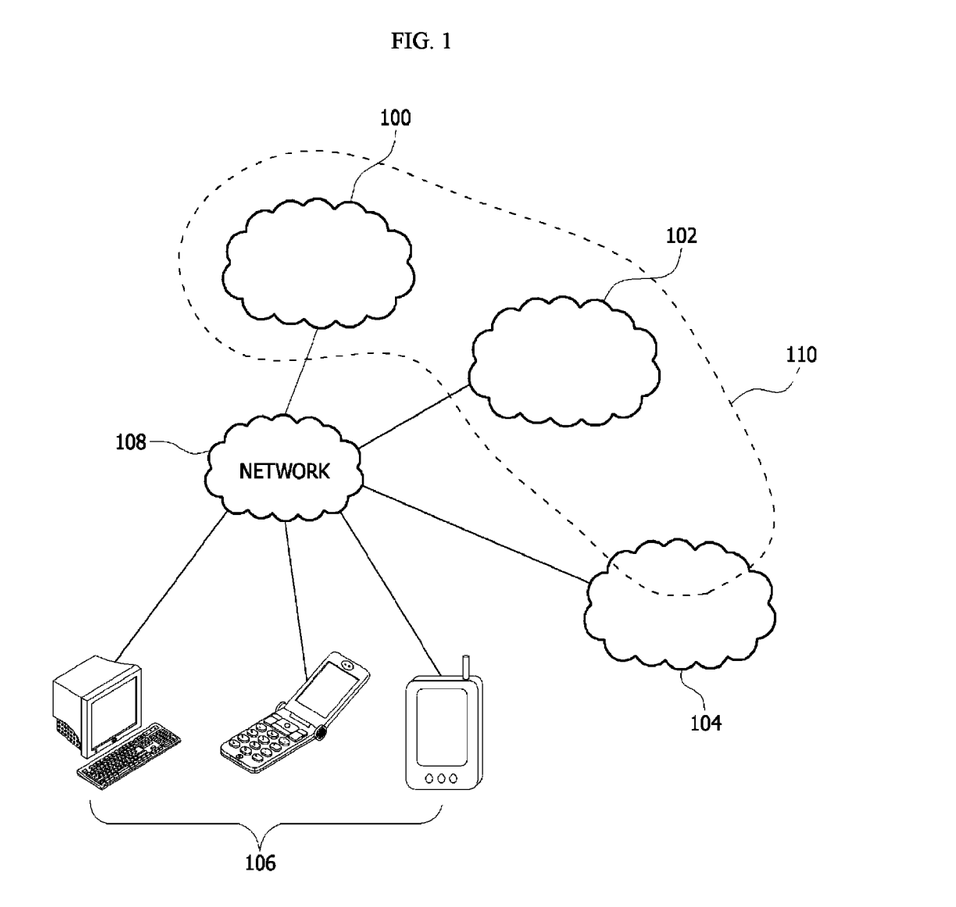
FIG. 1 shows an illustrative embodiment of an overall architecture of a dynamic resource collaboration network.

FIG. 1 shows an illustrative embodiment of an overall architecture of a dynamic resource collaboration network including a network service provider 100 and two collaborating network service providers 102 and 104. Two collaborating network service providers are depicted in FIG. 1 for simplicity and one skilled in the art will appreciate that there may be a different number of collaborating network service providers. For example, the number of the collaborating network service providers can vary depending on factors such as the amount of desired processing resources, network load or configuration, etc. The network service provider 100 is coupled to one or more client terminals 106 through a network 108. As used herein, the terms "connected," "coupled," or any variant thereof, means any connection or coupling, either direct or indirect, between two or more elements; the coupling or connection between the elements can be physical, logical, or a combination thereof.

In general terms, the client terminal 106 is a computing device on which a client (which may be an application) provides connectivity and access to the network service provider 100. The client may rely on various components of the network service provider 100 to perform the service operations provided by the network service provider 100. In operation, users (e.g., service consumers) use the client terminals 106 to connect to and utilize the services provided by the network service provider 100. For example, the client may be a web browser application, a calendaring application, such as MICROSOFT OUTLOOK, etc., or other interface application that is suitable for connecting to and communicating with the network service provider 100. Examples of the client terminals 106 include, without limitation, personal computers, mobile computers, laptop computers, handheld computers, mainframe computers, minicomputers, workstations, computing kiosks, mobile or portable communications devices such as cell phones, smart phones, personal digital assistants, etc., and so on.

The network 108 is a communications link that facilitates the transfer of electronic content between, for example, the attached computers including the network service provider 100, the collaborating network service providers 102 and 104, and the client terminals 106. In some embodiments, the network 108 includes the Internet. It will be appreciated that the network may include or be composed of one or more other types of networks, such as a local area network, a wide area network, a point-to-point dial-up connection, a cell phone network, and the like.

The network service provider 100 receives and processes service requests from the client terminals 106. Generally, the network service provider 100 includes computing resources sufficient to handle multiple service requests at the same time. However, there may be instances when the amount or number of service requests made to the network service provider 100 exceeds its processing capacity. In such cases, some of the user terminals 106 may experience delayed responses or failed service requests. If a service level agreement (SLA) has been entered into between the network service provider 100 and service consumers accessing or utilizing the client terminals 106, the delay or failure of some of the service requests may result in SLA violations which typically adversely affect the network service provider 100.

In this embodiment, the network service provider 100 acquires necessary or desired computing resources from one or both of the collaborating network service providers 102 and 104 if the network service provider 100 determines that its computing resources are insufficient to adequately service or handle the service requests from the client terminals 106. The collaborating network service providers 102 and 104 may be provided or maintained by network service vendors different from the network service provider 100, and may also provide services in response to service requests received from the client terminals 106 independently, similar to the network service provider 100. For example, the network service provider 100 may be a web service provider that operates and provides services through a website named "A.com", while the collaborating network service providers 102 and 104 may be other web service providers that operate and provide services through websites named "B.com" and "C.com," respectively.

When the collaborating network service providers 102 and 104 receive a request for computing resources from the network service provider 100, the collaborating network service providers 102 and 104 each performs negotiation with the network service provider 100, and may provide all or a part of its available computing resources to the network service provider 100 based on the result of the negotiation. As illustrated by the dashed line in FIG. 1, the collaborating network service provider 102 provides all of its available computing resources for use by the network service provider 100, while the collaborating network service provider 104 provides a part of its available computing resources for use by the network service provider 100. The acquisition by the network service provider 100 of the computing resources from the collaborating network service providers 102 and 104 results in the creation of a virtual organization (VO) 110 that includes the network service provider 100 and the acquired computing resources.

In the VO 110, the network service provider 100 assumes control of and utilizes the acquired computing resources to process the service requests, for example, in a manner similar to the network service provider 100 using its own computing resources. The resource collaborations and VO creations may be performed in real-time as necessary. For example, when the network service provider 100 requires external computing resources temporarily (e.g., to handle service request bursts), the network service provider 100 acquires computing resources from the collaborating network service providers, such as the collaborating network service providers 102 and 104, upon determining a need for external computing resources. Then, when the network service provider 100 determines that the external computing resources are no longer needed, the network service provider 100 terminates the resource collaboration of the acquired computing resources. In this embodiment, this type of resource collaboration may be referred to as "dynamic resource collaboration," or "dynamic collaboration."

VOs may vary in terms of purpose, scope, size and duration. There are two types of VOs: short-term or on-demand VOs, and long-term VOs. A short-term VO is created as necessary and maintained for a limited duration. Accordingly, with the short-term VO, the collaboration arrangement establishing process among the network service provider 100 and the network service providers 102 and 104 may be automated, thus resulting in the creation of the collaboration arrangement in a relatively short amount of time. Automating time-sensitive negotiations or arrangements, for example, as may be necessary with short-term VOs, allows the network service provider 100 to satisfy its obligations in its service consumer SLAs. In contrast, with a long-term VO, network service providers may collaborate for a longer period of time. Here, the negotiation may include a human-directed agent to possibly ensure that any resulting decisions comply with participating network service providers' strategic goals.

Figure 2:
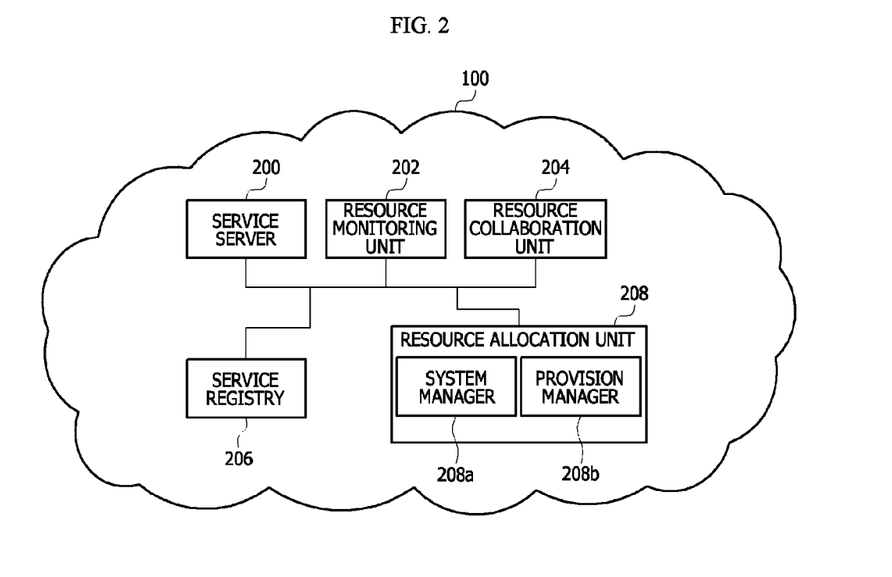
FIG. 2 shows an illustrative embodiment of a network service provider.

FIG. 2 shows an illustrative embodiment of the network service provider 100. As depicted, the network service provider 100 includes a service server 200, a resource monitoring unit 202, a resource collaboration unit 204, a service registry 206, and a resource allocation unit 208, where each component is coupled to at least one other component. The service server 200 includes computing resources to process service requests received from the client terminals 106. By way of example, the service server 200 may be a web server that accepts HTTP requests from client terminals 106 and serves HTTP responses along with optional data contents, which may be web pages such as HTML documents and linked objects (e.g., images or videos, etc). The computing resources may include CPU computation power, memory space, data storages, network connectivity, application resources, etc.

The resource monitoring unit 202 monitors the computing resources of the service server 200 and generates a resource request for supplementary computing resources from one or more collaborating network service providers based on the result of the monitoring. In one embodiment, the resource request is made to the resource collaboration unit 204, and the resource request notifies the resource collaboration unit 204 that the network service provider 100 is or may be depleting (i.e., running out of) it's computing resources that are available to service the service requests from the client terminals 106 and, accordingly, needs to obtain supplementary computing resources from one or more collaborating network service providers. In response to receiving the resource request from the resource monitoring unit 202, the resource collaboration unit 204 may initiate negotiation with one or more collaborating network service providers to acquire supplementary computing resources. In one embodiment, a resource request may be generated when the available computing resources are below a predetermined level. For example, the resource monitoring unit 202 may generate a resource request upon determining that the available computing resources is less than 5% of the computing resources. In an alternative embodiment, the resource monitoring unit 202 may generate a resource request if the available computing resources are less than the computing resources necessary to service the service requests received from the client terminals 106.

The resource collaboration unit 204 acquires supplementary computing resources from at least one of the collaborating network service providers. In response to receiving a resource request, the resource collaboration unit 204 may send a resource negotiation request to the collaborating network service providers. In some embodiments, the resource collaboration unit 204 sends a resource negotiation request to a subset of the collaborating network service providers. Resource negotiation requests are further discussed below. In response to a resource negotiation request, the collaborating network service provider determines whether to respond to the resource negotiation request. For example, the collaborating service provider may not be interested in making available (i.e., sharing) its computing resources. If the collaborating network service provider is interested in the resource negotiation request (i.e., the collaborating network service provider is willing to make some or all of its computing resources available to the requesting network service provider), the interested collaborating network service provider sends a resource negotiation response corresponding to the received resource negotiation request to the resource collaboration unit 204. Referring back to the embodiment depicted in FIG. 1, the collaborating network service providers 102 and 104 each sends a resource negotiation response to the resource collaboration unit 204 indicating a willingness to participate in creating the VO.

A resource negotiation request is an inquiry as to the receiving collaborating network service provider's willingness to provide supplementary computing resources, which are part of its available computing resources, for use by the sender of the resource negotiation request (e.g., the network service provider 100). In the case of the network service provider 100, the resource negotiation request may include service requirements and policy information of the service server 200. The service requirements of the service server 200 may include the amount and type of computing resources requested by the service server 200. The service requirements of the service server 200 may be generated based on current computing resource factors such as computing resource consumption, the amount of computing resources available, the amount of incoming service requests, etc., and/or the SLA requirements between the network service provider 100 and each of the client terminals 106 (i.e., the service consumers utilizing the client terminals 106). The policy information is a set of policies that specify conditions regarding the processing of service requests from the client terminals 106 (i.e., the service consumers utilizing the client terminals 106). The policy information may include access information (e.g., a list of service consumers who are authorized to access the network service provider 100), cost information (e.g., fees the service consumers are charged for processing their service requests), quality of service information (e.g., the level of service to be provided in servicing the service consumers and/or their service requests), etc.

A resource negotiation response notifies the resource collaboration unit 204 of the collaborating network service provider's willingness and ability to provide supplementary computing resources. The resource negotiation response may also include service requirements and policy information regarding the collaborating network service provider. The service requirements of the collaborating network service provider may include the amount and type of supplementary computing resources that can be provided. The policy information of the collaborating network service provider is a set of policies that specify conditions on providing the collaborating computing resources. The policy information of the collaborating network service provider may include access information (e.g., those authorized to access the supplementary computing resources), service providing cost information (e.g., fee charged for providing and/or utilizing the supplementary computing resources), quality of service information, etc.

In response to receiving a resource negotiation response from a collaborating network service provider, the resource collaboration unit 204 may select the collaborating network service provider to provide supplementary computing resources. Alternatively, the resource collaboration unit 204 may decide to refuse (i.e., not use) the supplementary computing resources offered by the collaborating network service provider. The resource collaboration unit 204 may make the selection decision based on information contained in the resource negotiation request and the resource negation response. By way of example, the resource collaboration unit 204 may select a resource negotiation response (that is, the collaborating network service provider who sent the resource negotiation response) that satisfies or most closely satisfies the service requirements specified in the resource negotiation request (i.e., the service requirements of the service server 200) corresponding to the resource negotiation response. In the case of multiple resource negotiation responses to a resource negotiation request, the resource collaboration unit may select one or more resource negotiation responses. By way of example, the resource collaboration unit 204 may select one or more resource negotiation responses, as necessary, to meet or nearly meet the service requirements specified in the resource negotiation request. If resource negotiation responses are received (i.e., no collaborating network service provider is interested in the resource negotiation request) or none of the received resource negotiation responses are selected (e.g., none of the resource negotiation responses are acceptable based on the information contained therein), the resource collaboration unit 204 may send another resource negotiation request with reconsidered (i.e., revised) service requirements.

When one or more collaborating network service providers are selected, the resource collaboration unit 204 may generate negotiated policies between the network service provider 100 and each of the selected collaborating network service providers, and acquire the supplementary computing resources from the selected collaborating network service providers according to the respective negotiated policies. A negotiated policy is a set of policies that specify conditions for acquiring and utilizing the collaborating computing resources. The negotiated policy is created based on the resource negotiation request and the resource negotiation response. The negotiated policy may include information regarding types of computing resources that are provided by the collaborating service systems, SLAs between the network service provider and the collaborating network service providers, resource providing costs, etc.

The service registry 206 stores the policy information and the SLA requirements of the service server 200. The resource allocation unit 208 allocates at least some of computing resources of the service server 200 to process the service requests. As depicted in FIG. 2, the resource allocation unit 208 may include a system manager 208a and a provision manager 208b. The system manager 208a manages the available computing resources of the service server 200 and selects the appropriate computing resources to service the service requests received from the client terminals 106. The provision manager 208b provisions the selected computing resources to process the service requests. Upon acquiring supplementary computing resources, the resource allocation unit 208 dynamically allocates at least a portion of the service request or requests to the acquired supplementary computing resources.

Various allocation schemes can be applied for allocating service requests. In one embodiment, the resource allocation unit 208 can allocate the service requests using a load-balancing scheme. By way of example, the resource allocation unit 208 can distribute the service requests proportionally based on the amount of computing resources of the service server 200 and the amount of acquired supplementary computing resources to balance the load between the network service provider 100 and collaborating network service providers. For example, assuming that the ratio of the amount of its computing resources to the acquired supplementary computing resources is 4 to 1, the resource allocation unit 208 may allocate 80 percent of the service requests to the computing resources of the service server 200 and 20 percent of the service requests to the acquired supplementary computing resources, respectively. In another embodiment, to reduce or minimize the cost for utilizing the supplementary computing resources, the resource allocation unit 208 may first try to allocate as many service requests as possible to the computing resources of the service server 200, and may allocate the service requests that cannot be processed by its computing resources to the supplementary computing resources. Furthermore, if there are multiple collaborating network service providers participating in a VO, the resource allocation unit 208 may consider various factors, such as types of required computing resources, cost information, negotiated policies, etc., to determine the collaborating network service provider or providers that are to receive the service requests. For example, a service request that requires processing by a specific kind of server application can be allocated to a collaborating network service provider that provides the server application, while a service request that specifies minimal quality of service can be allocated to a collaborating network service provider that charges minimum fees for servicing the service request. In addition to the above mentioned allocation schemes, various other allocation methods can be applied without detracting from the essence of the disclosed embodiments, as will be apparent to those skilled in the art.

Figure 3:
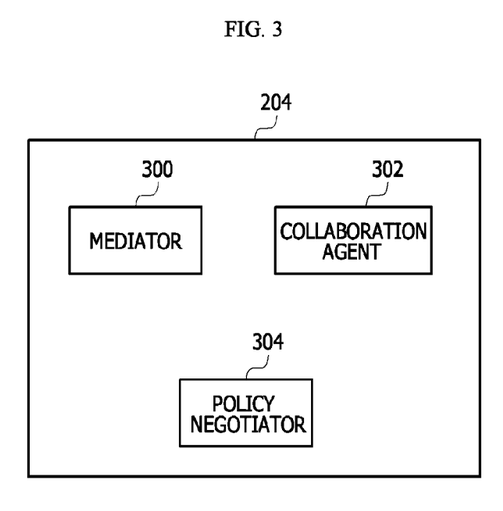
FIG. 3 shows an illustrative embodiment of a resource collaboration unit.

FIG. 3 shows an illustrative embodiment of the resource collaboration unit 204. As depicted, the resource collaboration unit 204 may include a mediator 300, a collaboration agent 302, and a policy negotiator 304. The mediator 300 generates a resource negotiation request including service requirements and policy information of the service server 200. The service requirements may be generated based on current computing resource factors of the service server 200 and SLA requirements of the client terminals 106 accessing to the network service provider 100. The current computing resource factors and the SLA requirements may be retrieved from the service registry 206. The collaboration agent 302 transmits the resource negotiation request to the collaborating network service providers. When the collaboration agent 302 receives resource negotiation responses from the collaborating network service providers interested in the resource negotiation request, the collaboration agent 302 may forward the received resource negotiation responses to the mediator 300. The mediator 300 may then send both the resource negotiation request and the resource negotiation responses to the policy negotiator 304. In some embodiments, the collaboration agent 302 may send the received resource negotiation responses to the policy negotiator 304. The policy negotiator 304 may then select none or at least one collaborating network service provider based on the contents of the resource negotiation request and the corresponding resource negotiation responses. The policy negotiator 304 may also generate the negotiated policies between the network service provider and each of the selected collaborating network service providers based on the contents of the resource negotiation request and the resource negotiation responses, and send the negotiated policies to the mediator 300. The mediator 300 may then request the collaboration agent 302 to acquire the external computing resources from the selected collaborating network service providers according to the negotiated policies, which results in the creation of a new VO that includes the external computing resources.

Figure 4:
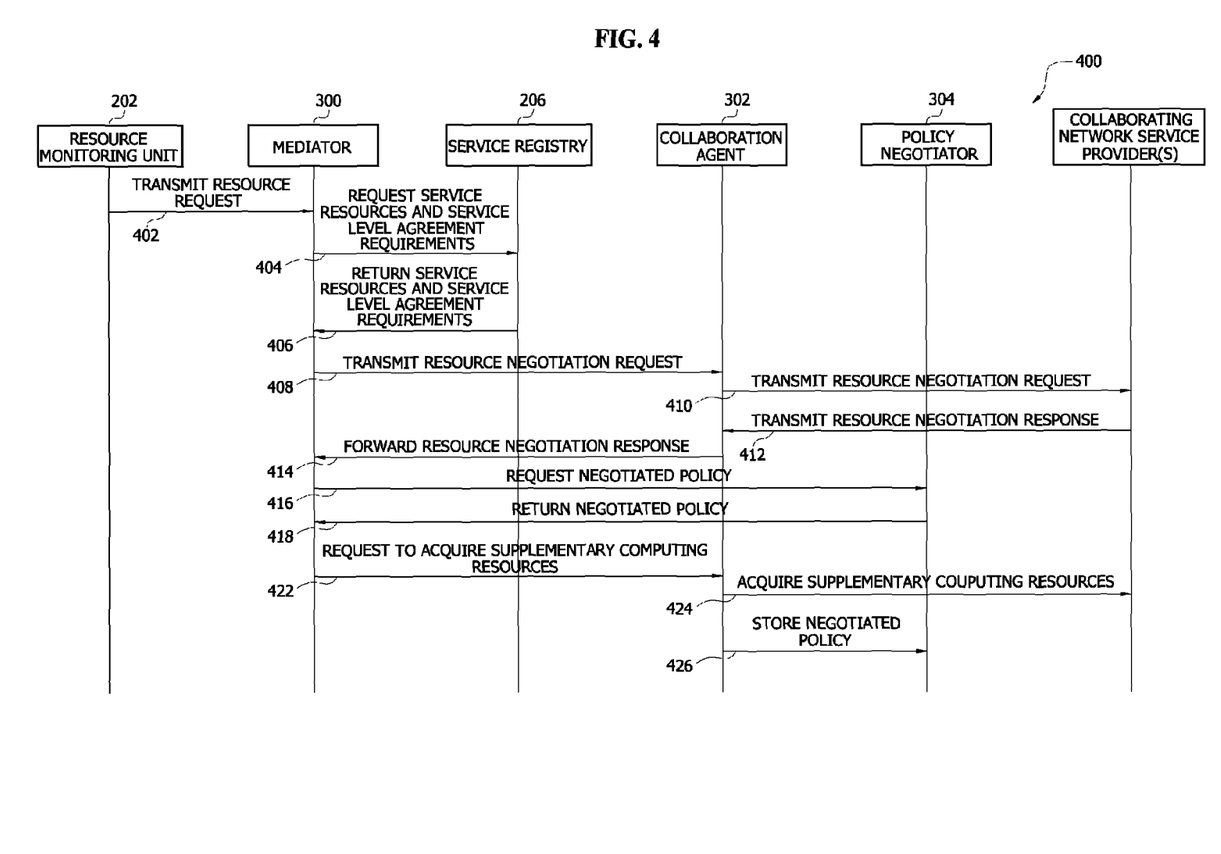
FIG. 4 is a sequence diagram of an illustrative embodiment of a method for acquiring supplementary computing resources.

FIG. 4 is a sequence diagram of an illustrative embodiment of a method 400 for acquiring supplementary computing resources. At stage 402, the resource monitoring unit 202 determines that the service server 200 does not have sufficient computing resources to adequately service or handle the service requests from the client terminals 106 (i.e., the service consumers utilizing the client terminals 106) and sends a resource request to the mediator 300. At stages 404 and 406, the mediator 300 retrieves current computing resource factors of the service server 200 and SLA requirements from the service registry 206. At stage 408, in response to receiving the resource request at stage 402, the mediator 300 generates a resource negotiation request, and sends the resource negotiation request to the collaboration agent 302. At stage 410, the collaboration agent 302 transmits the resource negotiation request to the collaborating network service providers and, at stage 412, receives resource negotiation responses from each of the collaborating network service providers interested in the resource negotiation request.

At stage 414, the collaboration agent 302 sends the received resource negotiation responses to the mediator 300. At stage 416, the mediator 300 sends the resource negotiation request and the resource negotiation responses to the policy negotiator 304 and requests the policy negotiator 304 to select the appropriate collaborating network service provider or providers and generate the appropriate negotiated policies. At stage 418, the policy negotiator 304 selects none or at least one collaborating network service provider, generates the appropriate negotiated policies between the network service provider 100 and each of the selected collaborating network service providers, and returns the negotiated policies to the mediator 300. At stage 420, the mediator requests the collaboration agent 302 to acquire the supplementary computing resources from the selected collaborating network service providers according to the negotiated policies and, at stage 422, the collaboration agent 302 acquires the supplementary computing resources. At stage 424, the collaboration agent 302 stores the negotiated policies received from the mediator 300 to the policy negotiator 304.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A system of a network service provider comprising:
   a service server configured to process service requests when received from one or more client terminals, wherein the service requests are associated with one or more computing resources;
   a resource monitoring unit configured to:
      monitor the computing resources to determine their availability to process the service requests received at the service server, and
      generate a resource request for supplementary computing resources from one or more collaborating external network service providers based on a result of the monitoring,
      wherein the result of the monitoring determines whether the supplementary computing resources are needed to process the service requests; and
   a resource collaboration unit configured to, in response to the resource request:
      send a resource negotiation request to the collaborating external network service providers in response to the resource request,
      receive a resource negotiation response corresponding to the resource negotiation request from each collaborating external network service provider that is a candidate to provide the supplementary computing resources,
      select at least one collaborating external network service provider for the supplementary computing resources based on the received resource negotiation responses,
      set a policy between the network service provider and each of the selected at least one collaborating external service providers based on the resource negotiation request and the resource negotiation response, and
      acquire the supplementary computing resources from the selected at least one of the collaborating external network service providers according to the policy, wherein the service server processes the service requests of the one or more client terminals with the computing resources and the supplementary computing resources
   wherein the resource collaboration unit sets the policy based on policy information included in the resource negotiation request and the resource negotiation response,
   wherein the policy information regarding:
      types of computing resources included in the supplementary computing resources, service level agreements between the network service provider and the selected at least one collaborating external service providers,
      a list of client terminals authorized to access the network service provider, quality of service information for the service requests, and
      costs of providing the supplementary computing resources.

2. The system of claim 1, wherein the resource monitoring unit is configured to generate the resource request when the available computing resources are below a particular level.

3. The system of claim 1, wherein the resource monitoring unit is configured to generate the resource request when the available computing resources are less than an amount of computing resources necessary to service the service requests.

4. The system of claim 1, wherein:
the policy information includes policy information of the service server and policy information of the collaborating external network service providers,
the resource negotiation request comprises service requirements and the policy information of the service server, and
the resource negotiation response comprises service requirements and the policy information of the collaborating external network service providers.

5. The system of claim 4, wherein policy includes a negotiated policy based on:
the service requirements and the policy information of the service server, and
the service requirements and the policy information of the selected collaborating external network service provider.

6. The system of claim 4, wherein the service requirements of the service server are based on current computing resource factors and service level agreement requirements necessary to service one or more service consumers.

7. The system of claim 6, wherein the selected at least one collaborating external network service provider meets the service level agreement requirements of the service server.

8. The system of claim 1, wherein the resource collaboration unit sets the policy by generating a negotiated policy between the network service provider and each of the selected at least one collaborating external service providers based on the resource negotiation request and the resource negotiation response, and acquires the supplementary computing resources from the selected at least one collaborating external service providers according to the negotiated policy.

9. The system of claim 1, further comprising a resource allocation unit configured to dynamically allocate at least a portion of the service requests to the acquired supplementary computing resources.

10. An apparatus embodied in a primary network system, wherein the primary network dynamically acquires external computing resources from one or more external network systems to supplement computing resources of the primary network system, the apparatus comprising:
a service server including one or more processors, the one or more processors adapted to operate with a mediator, a collaboration agent, and a policy negotiator,
wherein the mediator is configured to generate a resource negotiation request including service requirements and policy information associated with the primary network system in response to a resource request for the external computing resources,
wherein the resource request is generated when the service server determines that the external computing resources are needed to process service requests received by the service server,
wherein the collaboration agent is configured to transmit the resource negotiation request to the external network systems, and receive a resource negotiation response corresponding to the resource negotiation request from each of the external network systems that is a candidate to provide the external computing resources,
wherein the policy negotiator is configured to select at least one external network system for external computing resources based on the resource negotiation request and the resource negotiation response,
wherein a policy according to the policy information included in the resource negotiation request and the resource negotiation response is set for the selected at least one external network system,
wherein the service server is configured to acquire the external computing resources from the selected at least one external network system to supplement the computing resources of the primary network system and the service server processes the service requests with the computing resources and the acquired external computing resources, and
wherein the policy information includes:
types of computing resources included in the acquired external computing resources,
service level agreements between the primary network system and the selected at least one external network system,
a list of client terminals authorized to access the primary network system, quality of service information for the service requests, and
costs of providing the acquired external computing resources.

11. The apparatus of claim 10, wherein the mediator is further configured to generate the service requirements based on current computing resource factors of the primary network system and service level agreement requirements of service consumers accessing the primary network system.

12. The apparatus of claim 11, wherein the one or more processors are further adapted for operation with a service registry, the service registry being configured to store the current computing resource factors and the service level agreement requirements.

13. The apparatus of claim 10, wherein the policy negotiator is further configured to generate a negotiated policy between the primary network system and each of the at least one selected external network systems based on the resource negotiation request and the resource negotiation response.

14. The apparatus of claim 13, wherein the collaboration agent is further configured to acquire the external computing resources from the selected external network systems according to the negotiated policy.

15. One or more computer storage memory having stored thereon computer executable instructions that, when executed by at least one processor of a computer system in a primary network system, implement a method for acquiring supplementary resources from one or more external network systems to supplement computing resources of the primary network system, the method comprising:
monitoring, by the at least one processor, usage of the computing resources of the primary network system to determine their availability to process service requests from service customers of the primary network system, wherein the at least one processor is configured to service the service requests with the computing resources;
generating, by the at least one processor, a resource request for the supplementary resources according to a result of the monitoring, wherein the result of the monitoring determines whether the supplementary resources are needed to process the service requests;
transmitting, by the at least one processor, a resource negotiation request to the one or more external network systems in response to the resource request;

selecting, by the at least one processor, at least one external network system for the supplementary resources based on a resource negotiation result, corresponding to the resource negotiation request, received from each of the external network systems that is a candidate to provide the supplementary resources that responds to the resource negotiation request, wherein the service requests of the service customers are processed using the computing resources and the supplementary resources; and setting a policy between the primary network system and the selected at least one external network system, wherein the policy is based on policy information included in the resource negotiation request and the resource negotiation result received from the selected at least one external network system wherein the policy information includes:

types of computing resources included in the supplementary resources, service level agreements between the primary network system and the selected at least one external network system, a list of client terminals authorized to access the primary network system, quality of service information for the service requests, and costs of providing the supplementary resources.

16. The one or more computer storage media of claim 15, wherein the resource request is generated when available computing resources of the primary system are less than an amount of resources necessary to service the service requests received from the service consumers.

17. The one or more computer storage media of claim 15, wherein the resource negotiation request comprises service requirements and policy information associated with the primary network system.

18. The one or more computer storage media of claim 15, wherein the method implemented by the computer executable instructions stored thereon further comprises, setting the policy by:

generating a negotiated policy between the primary network system and each of the at least one selected external network systems based on the resource negotiation result; and acquiring the supplementary resources from the selected external network systems according to the negotiated policy.

19. The one or more computer storage media of claim 18, wherein the method implemented by the computer executable instructions stored thereon further comprises dynamically allocating some of the service requests received from service consumers to the acquired supplementary resources.

* * * * *

UNITED STATES PATENT AND TRADEMARK OFFICE
CERTIFICATE OF CORRECTION

| | |
|---|---|
| PATENT NO. | : 8,543,686 B2 |
| APPLICATION NO. | : 12/507938 |
| DATED | : September 24, 2013 |
| INVENTOR(S) | : Huh |

It is certified that error appears in the above-identified patent and that said Letters Patent is hereby corrected as shown below:

On the Title Page, in item (56), under "OTHER PUBLICATIONS", in Column 2, Line 1, delete "al" and insert -- al., --, therefor.

On the Title Page, in item (56), under "OTHER PUBLICATIONS", in Column 2, Line 4, delete "al" and insert -- al., --, therefor.

On the Title Page, in item (56), under "OTHER PUBLICATIONS", in Column 2, Line 7, delete "al" and insert -- al., --, therefor.

In the Drawings

Delete drawing sheet 3, and substitute the attached sheet 3, therefor.

In the Specification

In Column 9, Line 51, delete "thereof In" and insert -- thereof. In --, therefor.

In Column 9, Line 65, delete "and or" and insert -- and/or --, therefor.

In Column 11, Line 53, delete "thereof" and insert -- thereof. --, therefor.

In the Claims

In Column 12, Line 49, in Claim 1, delete "resources" and insert -- resources, --, therefor.

In Column 12, Line 54, in Claim 1, delete "regarding:" and insert -- regards: --, therefor.

Signed and Sealed this
Fifteenth Day of April, 2014

Michelle K. Lee
*Deputy Director of the United States Patent and Trademark Office*

CERTIFICATE OF CORRECTION (continued)
U.S. Pat. No. 8,543,686 B2

In Column 15, Lines 4-10, in Claim 15, delete "to the resource negotiation request, received from each of the external network systems that is a candidate to provide the supplementary resources that responds to the resource negotiation request, wherein the service requests of the service customers are processed using the computing resources and the supplementary resources; and" and insert the same at Line 3 after "corresponding" as a continuation.

In Column 15, Line 16, in Claim 15, delete "system" and insert -- system, --, therefor.

In Column 16, Line 1, in Claim 16, delete "media" and insert -- memory --, therefor.

In Column 16, Line 6, in Claim 17, delete "media" and insert -- memory --, therefor.

In Column 16, Line 10, in Claim 18, delete "media" and insert -- memory --, therefor.

In Column 16, Line 21, in Claim 19, delete "media" and insert -- memory --, therefor.